Aug. 18, 1925.  
J. N. GOURLEY  
1,549,827  
COLLAPSIBLE WHEEL RIM  
Filed July 17, 1924
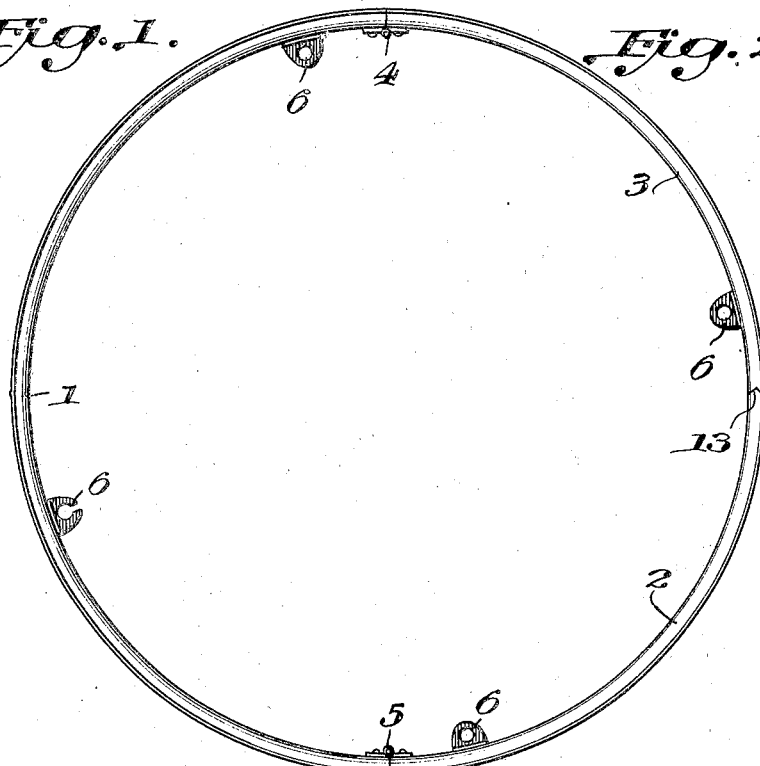
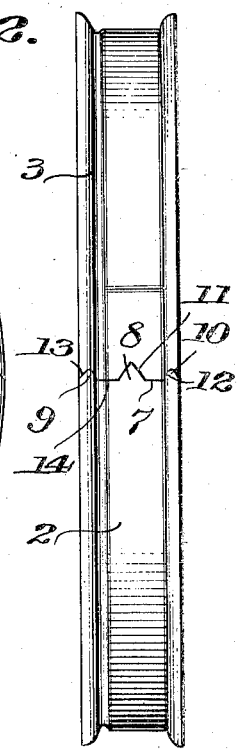
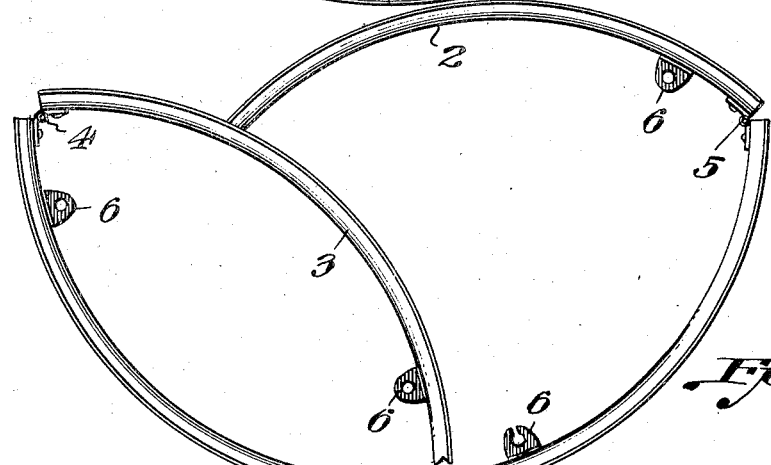
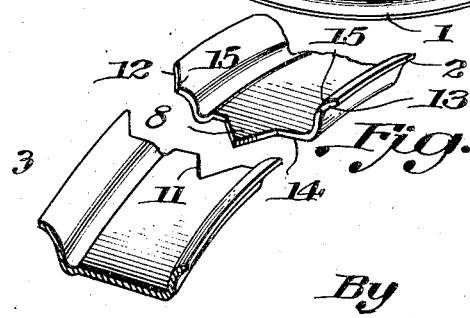
Inventor,
James N. Gourley Patented Aug. 18, 1925.

1,549,827

UNITED STATES PATENT OFFICE.

JAMES N. GOURLEY, OF EVANSVILLE, INDIANA, ASSIGNOR OF FIFTY-ONE PER CENT TO CLAUDE F. CURTIS, OF EVANSVILLE, INDIANA.

COLLAPSIBLE WHEEL RIM.

Application filed July 17, 1924. Serial No. 726,492.

*To all whom it may concern:*

Be it known that I, JAMES N. GOURLEY, a citizen of the United States, residing at Evansville, in the county of Vanderberg and State of Indiana, have invented certain new and useful Improvements in Collapsible Wheel Rims, of which the following is a specification.

This invention relates to sectional collapsible wheel rims of that general class provided with an interlocking joint for the free ends of the hinged sections.

The object of my invention is to provide a simple duplex interlocking joint of novel form, construction, and action for the free ends of the collapsible sections of the rim, parts of which will automatically interlock, after the tire has been placed on the rim and inflated.

My invention does away with the necessity of providing a bolt, swinging latch, or other special mechanical coupling between the free ends of the hinged sections.

My purpose is to provide an interlocking joint of the character set forth which will serve the double purpose of preventing radial movement of the joint and lateral movement thereof, when the tire is on the rim and in inflated condition.

A practical embodiment of the invention is described hereinafter and shown in the accompanying drawings, in which:

Figure 1 is a side elevation, the rim being closed.

Fig. 2 is a front view showing my improved locking joint.

Fig. 3 is a side elevation, the rim being collapsed; and

Fig. 4 is a detail perspective view of the interlocking sections of the joint.

The rim may be of as many sections as desired, according to established practice. In the present instance the invention is illustrated in connection with a three-section rim, the main section appearing at 1 and the foldable or collapsible sections being shown at 2, 3, respectively, hinged to the section 1 by hinges 4 and 5.

Suitable lugs 6 may be provided on the rim, if desired, but this feature constitutes no part of my invention.

My invention resides in the duplex interlocking joint 7 by which the free ends of the sections 2 and 3 are connected when the tire is in position on the rim and inflated, said joint doing away with bolts, latches and special fastenings such as heretofore have been commonly employed for securing the free ends of collapsible sections of a rim.

One of the sections, 2, is provided with pointed tongues 8, 9, 10. The other section, 3, has notches 11, 12, 13, conforming to and mating with the tongues 8, 9, 10. The ends of the sections 2, 3, are adapted to abut each other along the line 14, 14.

The tongue 8 and notch 11 are provided on the base or web parts of the sections 2, 3. The tongues 9, 10, and notches 12, 13, are provided on the side walls or flanges of sections 2, 3.

The edges of the notches 12, 13, and of the tongues 9, 10, are beveled as at 15.

When the tire has been placed on the rim and inflated, the ends of the sections 2, 3, are automatically drawn together and held in interlocked relation, the tongue 8 being then received in the notch 11 and the tongues 9 and 10 in the notches 12 and 13.

The pressure exerted by the inflated tire, by holding the parts of the joint in engagement as thus described enables the joint to make it impossible for the rim sections 2, 3, to move radially or laterally in relation to each other. This result is obtained because the tongue 8 and notch 11, when engaged, prevent lateral movement, whereas the tongues 9, 10, when engaged with the notches 12, 13, prevent relative radial movement of said sections.

Thus, without providing special fastenings, it is impossible for the rim sections 2, 3, to move away from the wheel felly, move inwardly in relation thereto, or to be relatively laterally displaced in relation to said felly while the tire is inflated.

I claim:

A wheel rim having collapsible sections whose free, meeting ends are provided with an exteriorly flat, smooth, unobstructed base and smooth side flanges, said bases and flanges defining an exteriorly smooth, unobstructed channel adapted to receive a tire, one of the sections being provided with a V-shaped notch in the end of its base and having V-shaped notches in the ends of its side flanges, the other section having a V- shaped tongue projecting from its base, and other V-shaped tongues on its side flanges, the tongue on the base being flush with the outer surface of the base, and the tongues on said side flanges being flush with the inner surfaces of the respective side flanges, the tongues and notches on the flanges having beveled edges and margins, respectively, and said tongues being adapted for reception in the corresponding notches by a camming action and serving as the sole locking means for the ends of the sections.

In testimony whereof I affix my signature.

JAMES N. GOURLEY.